United States Patent Office 3,420,721
Patented Jan. 7, 1969

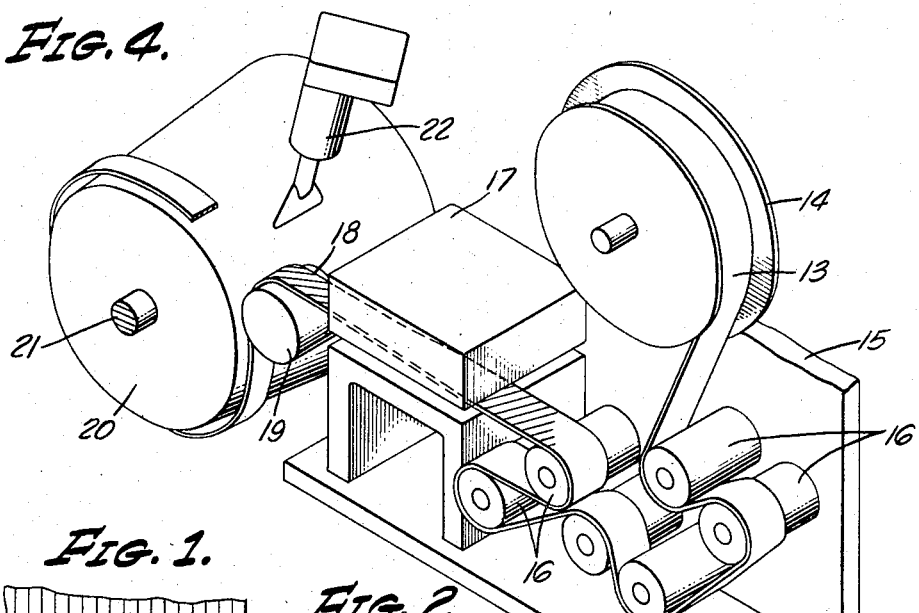
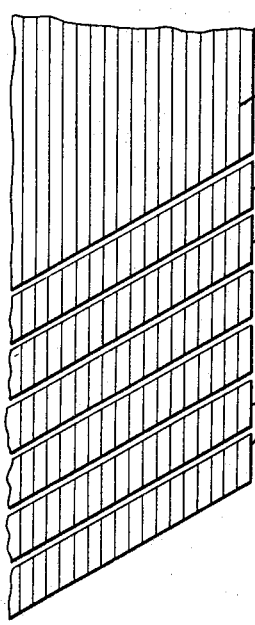
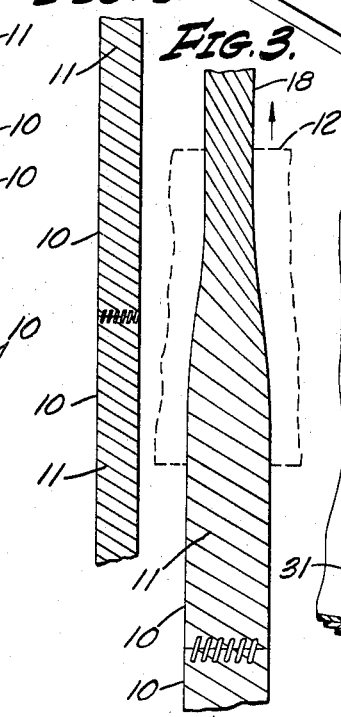
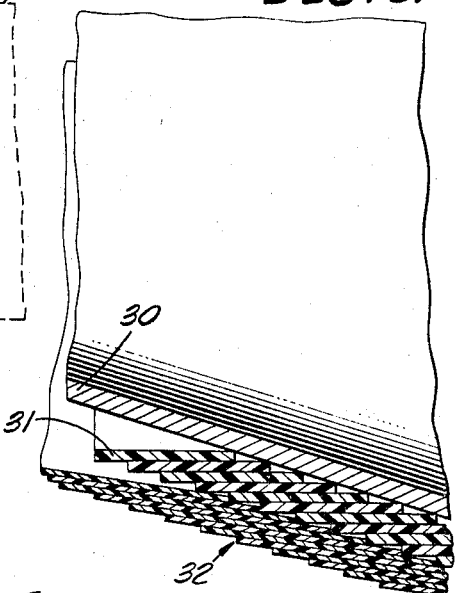
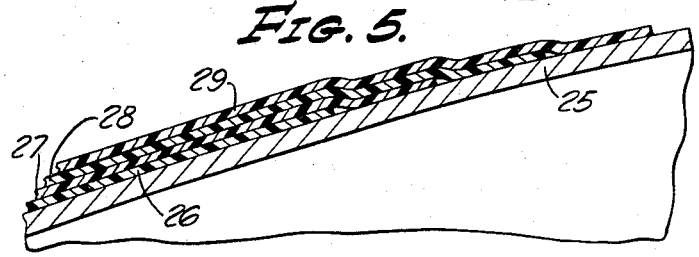
INVENTORS.
JAMES A. BAYLESS
EARL F. GRUHN
BY
ATTORNEYS

3,420,721
METHOD OF WRAPPING BIAS CUT TAPE UNDER LONGITUDINAL TENSION
James A. Bayless, Downey, and Earl F. Gruhn, La Mirada, Calif., assignors to Swedlow Inc., Garden Grove, Calif., a corporation of California
Filed Mar. 12, 1965, Ser. No. 439,308
U.S. Cl. 156—162    10 Claims
Int. Cl. B65h 81/08; B31c 3/00

ABSTRACT OF THE DISCLOSURE

A method of forming a strong, high density structure having a curved or otherwise contoured inner surface in which a tape which is maintained under longitudinal tension is wrapped around a suitable mandrel with the width of the tape being positioned generally parallel to the surface of the mandrel and each tape layer overlapping the previous layer.

---

This invention relates to a tape wrapping method and more particularly relates to such a method wherein the tape is subjected to longitudinal tension during the wrapping operation.

There is an increasingly large number of applications which demand structures that can be subjected to extremely high temperature conditions. One satisfactory manner in which such structures can be obtained is by winding a suitable filament or tape on a mandrel, curing the tape under suitable temperature and pressure conditions, machining the resultant structure, and removing the mandrel. A tape formed of a silica fabric impregnated with a suitable resin such as a phenolic resin has been found to be very satisfactory for this purpose. After curing, a structure formed of such a material will be extremely strong and will maintain its mechanical strength and physical integrity in a high temperature environment. Such structures are commonly employed in the construction of rocket motors and nozzles, jet engine liners, missile nose cones, or the like.

One problem that has been encountered in the wrapping of such structures is the inability of forming a wrap that is at an angle with the axis of the mandrel, for example, one that is substantially parallel to the surface of the mandrel. If, for example, the mandrel is conical or parabolic, it is relatively easy to wind a wrapping that is parallel to the axis of the mandrel. However, because the diameters of the mandrel presented to the two edges of the tape are different, it has been impossible to provide a winding parallel to the surface that is satisfactory, that is, one that firmly engages the mandrel at all points and not just in the area where the diameter of the mandrel is greatest.

It is therefore an object of the present invention to provide a method for winding a tape that will firmly engage all points of the surface of a mandrel or object having almost any configuration.

It is also an object of the present invention to provide such a method wherein the tape is wound at an angle to the axis of the mandrel.

It is another object of the present invention to provide such a method in which the tape is maintained under longitudinal tension during the winding operation.

It is a further object of the present invention to provide such a method wherein the tape used is formed from bias cut material.

These and other objects and advantages of the present invention will become more apparent upon reference to the accompanying description and drawings in which:

FIGURE 1 illustrates a piece of material from which strips are bias cut;

FIGURE 2 shows a tape constructed of strips of bias cut material;

FIGURE 3 illustrates the deformation of the tape after it has been heated and subjected to longitudinal tension;

FIGURE 4 is a schematic representation of apparatus suitable for carrying out the method of the present invention;

FIGURE 5 shows a portion of a parabolic mandrel wrapped with tape according to the present invention; and FIGURE 6 shows a conical mandrel provided with a liner wrapped parallel to the axis of the mandrel and an overwrap wrapped at an angle to the axis.

Briefly, the present invention utilizes the capability of a bias cut material to conform to the shape of an object into which it is brought into engagement. According to the present invention, a tape formed of strips of bias cut material, for example, a silica fabric, is kept under longitudinal tension while it is passed through a heater and wrapped onto a mandrel. As the tape passes through the heater, the resin impregnation is softened and the fibers that were the original longitudinal or warp fibers of the material are caused to be pulled toward alignment with the longitudinal axis of the tape from their original bias angle with a consequent elongation of the tape in the longitudinal direction and narrowing of the tape in the transverse direction. When the tape engages the mandrel, essentially all of the tension forces will be exerted on the small contact area of the tape, and the remainder of the tape will attempt to recover or shrink to its original shape. This will continue until the remaining portion of the tape engages with and conforms to the mandrel surface. Thus, the entire tape will make a good contact with the mandrel and, moreover, the action of the tape in attempting to resume its initial shape will cause it to be firmly compacted onto the mandrel.

Turning now to the drawings, FIGURE 1 shows a representation of a piece of material, for example, a phenolic resin impregnated silica fabric, from which strips 10 are cut at a bias angle of 30° to the warp of the fabric, the fibers of which are represented by the lines 11. These strips 10 are then sewn together to form a continuous tape as shown in FIGURE 2. If desired, a heat seal or other suitable method of joining the strips 10 may be used by a sewn connection is preferable. As can be seen, the warp fibers 11 of the material are now displaced from the longitudinal axis of the tape by the bias angle. When the tape is placed under longitudinal tension, the warp fibers 11 will attempt to align themselves with the longitudinal axis with the result that the tape will be elongated and narrowed down as shown in FIGURE 3.

In this figure, the tape is shown passing through a heat zone 12 which serves to soften the resin sufficiently to permit the desired deformation. Such a heat zone is, of course, only necessary where there is a solid resin impregnation of the tape. Other materials could be wrapped which would not require such a heat treatment. For example, any elastomeric material such as rubber could be formed into a tape and wrapped without the necessity of a heating stage. For the purposes of this application, any material which can be longitudinally and laterally deformed by exertion of longitudinal tension and which will substantially recover to its original shape when the tension is removed will be defined as a "deformable and recoverable" material.

Turning now to FIGURE 4, there is shown in schematic fashion apparatus suitable for performing the method of the present invention. A bias cut tape 13, such as that shown in FIGURE 2, is fed from a reel 14 mounted on a framework 15 to a series of tensioning rollers 16. The manner in which the tape can be passed through these tensioning rollers to achieve the proper tension will be apparent to those skilled in the art and no detailed explanation is believed necessary.

After leaving the tensioning rollers 16, the tape is passed through a heater 17, for example, an infrared heater, where the resin impregnation is softened. The tension exerted on the tape by the tensioning rollers 16 is now sufficient to cause the warp fibers to be pulled around in the longitudinal direction with the result that the tape is elongated and narrowed down. The narrowed down tape 18 is passed over a pressure roller 19 and wound on a mandrel 20 which is mounted on and rotated by an axial shaft 21. If desired, a hot air heater 22 can be provided to maintain the tape at an elevated temperature as it is applied to the mandrel. The pressure exerted by the pressure roller 19 is preferably only sufficient to keep the tape in contact with the mandrel 20. Any suitable wrapping machine can be used for carrying out this method, for example, the Edwards Enterprises lathe-type tape wrapping machine.

Turning now to FIGURE 5, there is shown a portion of a parabolic mandrel wrapped in accordance with the process of the present invention. The mandrel portion 25 is shown to have a smooth outer surface although such is not required as tape wrapped in accordance with the present invention is capable of following undulations in a surface. This is illustrated by the figure which shows a series of layers of tape being wrapped in an overlapping relationship on the mandrel portion 25. The first tape layer 26 tightly hugs and closely follows the surface of the mandrel portion 25. The second layer 27 is positioned over the layer 26 with a substantial overlap relative to the thickness of the tape and, as shown, follows closely the contour of the surface on which it is laid, i.e., the mandrel portion 25 and layer 26. In a similar manner, the layers 28 and 29 are wrapped over the earlier layers and closely follow the composite surface on which they are laid.

This close conformity to the surface upon which a tape is laid is due to the fact that the tape is deformable and recoverable and is laid under substantial longitudinal tension. As a result of this longitudinal tension, the tape is elongated in the longitudinal direction and narrowed in the transverse direction. For example, in the case of a bias cut tape, the warp fibers of the fabric are pulled by the tension into closer alignment with the longitudinal axis of the tape. When the tape is applied to a mandrel or surface of varying diameter, for example, a parabolic surface, one edge of the tape will engage the mandrel and the other will not. The edge that engages the mandrel, of course, is that edge of the tape which is to contact the mandrel in the larger diameter region.

As soon as this contact is made, essentially all of the tension forces are transmitted through this edge region of the tape with the result that the remainder of the tape will seek to assume its original shape. Since the tape was elongated, each portion of it will shrink radially inwardly until it engages the surface over which it is wrapped. Thus, so long as the smallest circumference of the portion of the mandrel which a single width of tape must cover is not less than the original length of the wrapping before tension was applied, the tape will make extremely tight engagement with the mandrel. Moreover, this action of the tape in attempting to recover to its original shape will exert a compacting force on the layers of tape below it and thus a high density wrap will be obtained. As can be seen, this density is easily reproducible as it is only necessary to exert the same tension during each wrapping operation.

FIGURE 6 shows another type of structure that can be produced by using the method of the present invention. In this figure, a conical mandrel portion 30 is first wrapped with a tape 31, each layer of which is wrapped parallel to the axis of the mandrel. After this first wrap is completed by any conventional method, an overwrap 32 is wrapped in accordance with the present invention and is wrapped at an angle to both the axis of the mandrel and the surface of the mandrel. If desired, the overwrap could, of course, be wrapped parallel to the surface of the mandrel.

As an example of the process of the present invention, a conical mandrel having an angle between its surface and its axis of 17° was wrapped with a tape formed from conventional silica fabric impregnated with a phenolic resin. The material was .025 inch thick and was cut at a bias of 30° in eight inch wide strips. The strips were sewn together into a long tape. The tape was then mounted in apparatus similar to that shown in FIGURE 4. The temperature within the heater 17 was established at about 180° F. which caused the resin to soften sufficiently to permit longitudinal tension to distort the fabric of the material. The apparatus was adjusted to exert a tension more than sufficient to narrow the tape as much as possible, at which point the width of the tape was reduced to four inches. The hot air heater 22 was utilized to keep the point at which the tape engaged the mandrel at about 180° F. The tape was then wrapped on the mandrel with a one-quarter inch advance while the tension was maintained at all times. After the wrap was completed, the structure was cured in the conventional manner, machined, and the mandrel removed.

From the foregoing description, it can be seen that the method has been provided for wrapping a tape upon a mandrel of non-uniform diameter at an angle to the axis of the mandrel. The method is extremely useful in forming structures having the configuration of a conic section, for example a cone or a parabola. The method also enables a wound structure to be formed which faithfully follows the configuration of a mandrel having non-uniform surface characteristics, such as one having undulations, grooves, or the like formed therein. The density of the wound material can be easily controlled and reproduced as it is dependent only upon the nature of the material itself and the tension which is exerted on it during the winding operation. No compacting rollers need be used with the method and thus a source of possible trouble and considerable expense and design complexities is eliminated.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A method of forming a structure over an object having a contoured surface comprising: exerting a longitudinal tension on a deformable and recoverable tape to deform said tape, wrapping said deformed tape in overlapping layers about said surface with the width of the tape generally parallel to said surface such that only a portion of each layer of said tape initially engages said surface, said initial deformation being sufficient to permit each layer of said tape to recover into engagement and conformity with said surface after said initial engagement of said portion of said tape with said surface.

2. The method of claim 1 wherein said tape is a bias cut fabric.

3. The method of claim 2 wherein said fabric is a resin impregnated silica fabric.

4. The method of claim 2 wherein said tape is passed through a heating zone before being applied to said surface.

5. The method of claim 3 wherein said tape is passed through a heating zone before being applied to said surface.

6. The method of claim 2 wherein said tape has a bias of 30°.

7. The method of claim 3 wherein said tape has a bias of 30°.

8. The method of claim 1 wherein said tension is sufficient to extend said tape to its maximum length.

9. The method of claim 2 wherein said tension is sufficient to reduce said tape to its minimum width.

10. The method of claim 5 werein said heating zone is sufficiently hot to soften said resin sufficiently to permit said tension to distort said tape.

References Cited

UNITED STATES PATENTS

| | | | |
|---|---|---|---|
| 1,665,585 | 4/1928 | Esch | 156—162 |
| 1,622,048 | 3/1927 | Pierson | 156—162 |
| 3,115,271 | 12/1963 | Anderson et al. | 156—189 XR |
| 2,339,121 | 1/1944 | Van Cleef | 156—152 |
| 2,008,423 | 7/1935 | Ritchie. | |

FOREIGN PATENTS 647,059  12/1950  Great Britain.

PHILIP DIER, *Primary Examiner.*

U.S. Cl. X.R.

156—189; 60—200; 220—83